US007185441B2

(12) United States Patent
Lockyer

(10) Patent No.: US 7,185,441 B2
(45) Date of Patent: Mar. 6, 2007

(54) MULTIPLE UNIT TRANSPARENT MEASURING DEVICE

(76) Inventor: William A Lockyer, 2680 Woodridge Ct. #3, Placerville, CA (US) 95667

( * ) Notice: Subject to any disclaimer, the term of this patent is extended or adjusted under 35 U.S.C. 154(b) by 0 days.

(21) Appl. No.: 11/158,535

(22) Filed: Jun. 21, 2005

(65) Prior Publication Data

US 2006/0283026 A1 Dec. 21, 2006

(51) Int. Cl.
*B43L 13/20* (2006.01)
*G01B 3/14* (2006.01)

(52) U.S. Cl. .......................................... 33/562

(58) Field of Classification Search .................. 33/1 G, 33/562, 563–566, 1 SD, 458
See application file for complete search history.

(56) References Cited

U.S. PATENT DOCUMENTS

| | | | | |
|---|---|---|---|---|
| 647,339 A | | 4/1900 | Thompson | |
| 2,171,504 A | | 8/1939 | Keuffel | |
| 2,459,694 A | | 1/1949 | Gordon | |
| 3,465,445 A | * | 9/1969 | Fisher | 33/41.1 |
| 3,699,660 A | * | 10/1972 | Siegel | 33/565 |
| 3,864,263 A | | 2/1975 | Jethwa | |
| 3,939,564 A | | 2/1976 | Slawinski | |
| 4,468,860 A | | 9/1984 | Rodengen | |
| 4,530,156 A | * | 7/1985 | Kettlestrings | 33/562 |
| 4,589,210 A | * | 5/1986 | Konrad | 33/562 |
| 4,594,792 A | * | 6/1986 | Cramb | 33/562 |
| 4,779,346 A | | 10/1988 | Schafer | |
| 4,972,590 A | | 11/1990 | Dentith | |
| 5,384,964 A | * | 1/1995 | McKay | 33/565 |
| 5,390,418 A | * | 2/1995 | Buono et al. | 33/565 |
| 5,768,791 A | | 6/1998 | V | |
| 5,791,062 A | | 8/1998 | Walker | |
| 5,819,422 A | | 10/1998 | Schafer | |
| 6,115,926 A | | 9/2000 | Robell | |
| 6,286,224 B1 | * | 9/2001 | Lewis | 33/562 |
| 2003/0110653 A1 | | 6/2003 | Schafer | |
| 2003/0177655 A1 | | 9/2003 | Fordham | |
| 2004/0035016 A1 | | 2/2004 | Brady | |
| 2004/0049935 A1 | | 3/2004 | Tandy | |
| 2004/0128851 A1 | | 7/2004 | Brown | |
| 2004/0143983 A1 | | 7/2004 | Amaru | |
| 2004/0154175 A1 | | 8/2004 | Shapiro | |
| 2004/0163269 A1 | | 8/2004 | Brady | |
| 2006/0005411 A1 | * | 1/2006 | Goldman | 33/562 |

* cited by examiner

*Primary Examiner*—G. Bradley Bennett
(74) *Attorney, Agent, or Firm*—Gross & Associates

(57) ABSTRACT

A multiple unit transparent measuring device comprised of eighteen +/− individual units, which may be assembled in a variety of combinations, including a single unit. Two of the units are a main top plate and a main bottom plate. The main plates may be held together by a peripheral retainer, in itself a multifunction measuring device. The main top plate comprises multiple painted measuring markings in variety of colors and line widths. The main bottom plate, also with painted markings, is partially comprised of twelve +/− varied-sized pocketed triangles and squares. The main plates may also be connected lengthwise, to make one longer measuring device. All units are formed from a transparent material such as polycarbonate.

20 Claims, 10 Drawing Sheets

MULTIPLE UNIT TRANSPARENT MEASURING DEVICE

BACKGROUND OF THE INVENTION

1. Field of Invention

This invention relates to measuring devices, specifically to an improved measuring device employed in quilting and other crafts for cutting, measuring, or marking of a variety of materials, such as cloth fabric, paper, or plastic.

2. Description of Related Art

A variety of transparent measuring devices are used in quilting and other crafts. The purposes of these measuring devices are the measuring or marking of fabric, paper, plastic, and the like, or as a cutting guide for a tool, such as a rotary cutter or knife.

Presently available transparent measuring devices have a variety of disadvantages, which include:

a) These measuring devices are almost exclusively individual units, even though some have more than one use.
b) One size or shape of measuring device along is often not adequate for a given quilting or other craft project.
c) A variety in measuring capability is diminished with an individual unit device.
d) These measuring devices often necessitate transporting from one work location to another, which locations may be considerable distances apart. This leads to cumbersome portability, especially for the often employed 6 inch ×24 inch single unit.
e) When these measuring devices are purchased individually, it is of considerable financial burden to the quilting or craft person.
f) These transparent measuring devices are almost exclusively formed from an acrylic substance, which is quite breakable relative to several other polymers.
g) These transparent measuring units generally disallow single measurements of greater than 24 inches.

Accordingly, several objects and advantages of the present invention are:

a) The present invention includes multiple individual units, therein affording use of the units individually, in combination, or as multiple units with assembly as a single unit.
b) The variety of immediately available sizes and shapes of transparent measuring devices is significantly enhanced.
c) The variety of measurement capability is distinctly enhances by multiple units.
d) Portability is markedly enhances, since the top plate may be placed on top of the bottom plate, to create a single unit which can be held together by a peripheral retainer.
f) The individual units may be connected in various ways to create a variety of useful shapes, such as connecting the top and bottom plates lengthwise, or connecting the two halves of a separated top plate lengthwise.
g) The four piece peripheral retainer is useful in creating a picture frame shaped encasement around the single unit created by the top plate being placed on top of the bottom plate, or the pieces of the retainer may be connected lengthwise to create a ruler of greater than four fee length.
h) The individual units of the device are less likely to be lost, as the multiple units may be stored or transported as a single unit.
i) The cost to a consumer is markedly reduced, as the multiple nit device may be purchased as a single assembly with 18+/− individual units, wherein each unit would cost markedly less than if individually purchased.

j) The present invention may be made of a transparent plastic polymer such as polycarbonate, which is less apt to break or chip than the often employed acrylic of present transparent measuring devices.
k) Additional objects and advantages, such as alternative shapes and uses, will become apparent upon considering the attendant drawings and descriptions.

BRIEF SUMMARY OF THE INVENTION

The present invention is a multiple unit transparent measuring device comprising units of variable size and shape. These units may comprise individual units, partially connected units, nested units, or units connected with a peripheral retainer such as to be seen as a single unit. Two of the basic multiple unites are a main top plate and main bottom plate, each being of equal square shape and size. The main top plate may be a solid planar plate, or two equally sized half plates. The main bottom plate is a solid planar plate partially comprised of cutouts on one face, such as to create varied sized pockets for nesting of twelve (12)+/− squares and triangles. Each main plate, and each pocketed square and triangle, may have numerous painted markings, such as multiple grid lines, numbers and angle coordinates, of varies color. When the top plate is placed flat on top of the bottom plate, making a two layer single unit, the plates may be held together with a peripheral retainer, which in itself may be employed as a measuring device. The two main plates may also be connected, when placed side by side, by a special snap button push-out system, creating a much longer measuring device. This connection allows for the simple creation of a measuring device which is an excellent length for marking, cutting, or otherwise utilizing the measuring device, yet with the ability to be taken apart and transported as a smaller and more portable unit, or stored using less space. Each unit is manufactured from a transparent plastic material, such as polycarbonate, which is markedly less breakable than the usual acrylic material commonly used for such measuring devices.

BRIEF DESCRIPTION OF THE DRAWINGS

Various exemplary embodiments of this invention will be described in detail, with reference to the following figures, wherein.

REFERENCE NUMERALS IN DRAWINGS

Figure 1A:
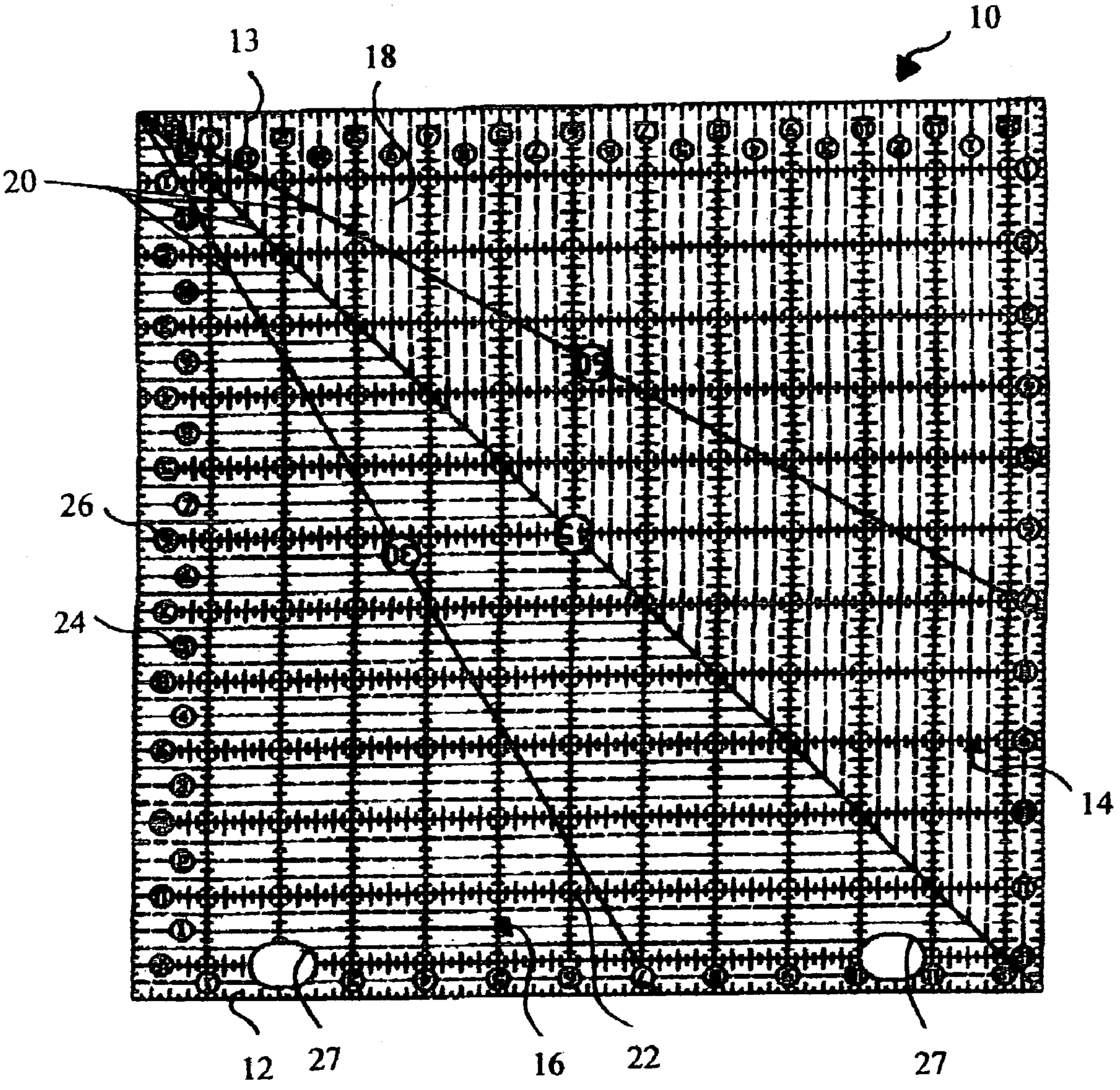
FIG. 1A is a top plan view of the main top plate.

The following is a list of reference numbers used on FIGS. 1–7:

10 main top plate
12 example of periphery hatch marks main top plate
13 example of complimentary periphery hatch marks main top plate
14 main horizontal ruled line, top plate
16 main vertical ruled line, top plate
18 hatched markings for improved use precision, top plate
20 angle lines for cutting and marking
22 open areas for improved visibility
24 incremental circled distance markers
26 decremental circled distance markers
27 female portion of snap button push-out connection system
28 main bottom plate
30 first set of nested triangles
30*a* largest triangle of set 30 nested triangles
30*b* second triangle of set 30 nested triangles
30*c* third triangle of set 30 nested triangles
32 second set of nested triangles
32*a* largest triangle of set 32 nested triangles
32*b* second triangle of set 32 nested triangles
32*c* third triangle of set 32 nested triangles
34 third set of nested triangles
34*a* largest triangle of set 34 nested triangles
34*b* second triangle of set 34 nested triangles
36 set of nested squares
36*a* largest square of set 36 nested squares
36*b* second square of set 36 nested squares
36*c* third square of set 36 nested squares
36*d* fourth square of set 36 nested squares
38 male portion of snap button connection system
39 recess depth of made side of lengthwise connection system
40 peripheral retainer
41 two of four units of peripheral retainer, each with male ends
42 tow of four units of peripheral retainer, each with female ends
43 examples of measurement markings on retainer units
44 example of oval locking system holding nested shapes
45 example of round locking system holding nested shapes
46 example of oblong locking system holding nested shapes
47 example of perimeter hatch marks nested triangles
48 example of perimeter distance marker number nested triangles
49 example of perimeter hatch marks nested squares
50 example of perimeter distance marker numbers nested squares
51 angle marking on nested squares
52 partial side view, male connector portion, peripheral retainer
54 partial top view, male connector portion, peripheral retainer
56 partial top view, female connector portion, peripheral retainer
58 partial side view, female connector portion peripheral retainer
59 recess-groove depth on internal lengthwise edge, peripheral retainer unit

60 partial top view, main bottom plate side, housing male snap button parts
62 partial top view, main top plate side, housing female snap button parts
64 recess depth of female side of lengthwise connection system
66 detail A of one snap button portion, male side
68 detail A, section B—B, of reference numeral 66
70 detail A, section A—A, of reference numeral 66
72 partial end view of bottom plate with snap button connection
74 partial end view of top plate with snap button connection
75 examples of taper lock system holding nested shapes, main bottom plate
76 main top plate and main bottom plate connected lengthwise
78 partial top view, mortise portion, mortise and tenon connection system
80 partial side view, mortise portion, mortise and tenon connection system
81 detail A of side view, mortise portion, mortise and tenon connection system
82 section A—A, detail A of reference numeral 80
84 partial top view, tenon portion, mortise and tenon connection system
86 partial side view, tenon portion, mortise and tenon connection system
87 detail B of side view, tenon portion, mortise and tenon connection system
88 section A—A, detail B of reference numeral 86

DETAILED DESCRIPTION OF THE INVENTION

FIG. 1A shows a main top plate 10, which is the first of three main parts of the preferred embodiment of the present measuring device. The main top plate 10 is a transparent, solid, square-shaped planar plate. The entire perimeter of the main top plate 10 may be hatch marked with standard ⅛ inch lines 12 of variable length. Each of these hatch lines 12 may meet a complimentary hatch line 13 on the opposite side of the main plate 10 by one of two paths. The first path for a hatch mark 12 to meet a complimentary hatch mark 13 may be by a continuous main horizontal ruled line 14 or a continuous main vertical ruled line 16. Each main horizontal ruled line 14 may be an exact distance from any other main horizontal rules line 14, and each main vertical ruled line 16 may be an exact distance from any other main vertical ruled line 16. The main continuous lines 14 and 16, being at 90-degree angles one from another, therein create exact grid line rectangular or square shapes on the surface of the main top plate 10, for accuracy in measuring with the device.

The second path for any hatch mark 12 to meet a complimentary hatch mark 13 may be by placing hatch marks 18 along the entire length between any hatch mark 12 and its complimentary hatch mark 13. This creates measured interrupted lines across the main top plate 10, for improved use precision in measuring with the device.

Beginning at one corner of the superior face of the main top plate 10, a set of angled lines 20 may be placed. These angled lines 20 may be places at angles such as 30 degrees, 45 degrees, and 60 degrees from one edge of the main top plate 10. Each of these angled lines 20 may be extended to meet another edge of the main top plate 10. Each of these angled lines 20 may be marked with a circled angle number along its length, and each angled line 20 may be further delineated by creating each line 20 employing a combination of hatch marks, dots, or numbers.

At intersections areas of the main horizontal ruled lines 14 and main vertical ruled lines 16, the hatch markings may create square open areas for improved visibility 22, shaped as an open picture frame and useful in accuracy of measurement with the device.

Near the extremities of each main horizontal ruled line 14 and each main vertical ruled line 16 there may be incremental circled distance marker numbers 24 for use in measuring with the device. At points exactly between incremented circled distance marker numbers 24 there may be decremental-circled distance marker numbers 26. The incremental circled distance marker numbers 24 on any given side of the main top plate may each be the same distance from each main horizontal ruled line 14 or each main vertical ruled line 16, and the same distance from each other. The decrement circled distance marker numbers 26 on any given side of the main top plate 10 may each be placed at different distances along the main horizontal ruled lines 14 or main vertical ruled lines 16 from the incremental circled distance marker numbers 24 of the same side, yet each decrement circled distance marker number 26 may be of equal distance from any other decrement circled distance marker number 26 from each main horizontal ruled line 14 or each main vertical ruled line 16. Incremented circled distance marker numbers 24 may be of a different color than decrement circled distance marker numbers 26. The reason for the difference in color and placement of incremental distance marker numbers 24 from decrement distance marker numbers 26 pertains to allowing left-handed users of the device to read and measure along one set of distance marker numbers, while right-handed users might employ the other set of distance marker numbers for an equal measurement result with greater ease.

All hatch marks, continuous lines and circled numbers of the top plate 10 may be painted with various colors and hues, to further improve differentiation of markings for use in measuring with the device. The width of hatch marks and lines, as well as the size of circles and circled numbers, may vary, to still further improve differentiation of markings for use in measuring with the device.

Near one edge of the main top plate 10 are female portions of the preferred snap button push-out connection system 27 from lengthwise connection of one side of the main top plate 10 with one side of the main bottom plate 28. A lengthwise connection of the main top plate 10 with the main bottom plate 28 allows the useful length of the measuring device to be approximately doubled, as illustrated in FIG. 6. The increased useful length of the measuring device is very important in measuring and cutting in quilting and craftwork. The increased useful length of the measuring device by lengthwise connection is not at the expense of portability, since the lengthwise connection of the main top plate 10 and main bottom plated 28 may be disconnected, returning the main top plate 10 and the main bottom plate 28 to their respective original dimensions. This is a distinct advantage over generally employed 24-inch length individual units presently available. The female portions of the snap button connection system 27 are complimentary to the male portions of the snap button connection system 38. The number of said snap button push-out devices 27 and 38 may vary on each said main top plate 10 and each said bottom plate 28, such as to provide alternative lengthwise connection systems. Further details of the snap button connection system are delineated with discussion of FIG. 5 below.

Figure 1B:
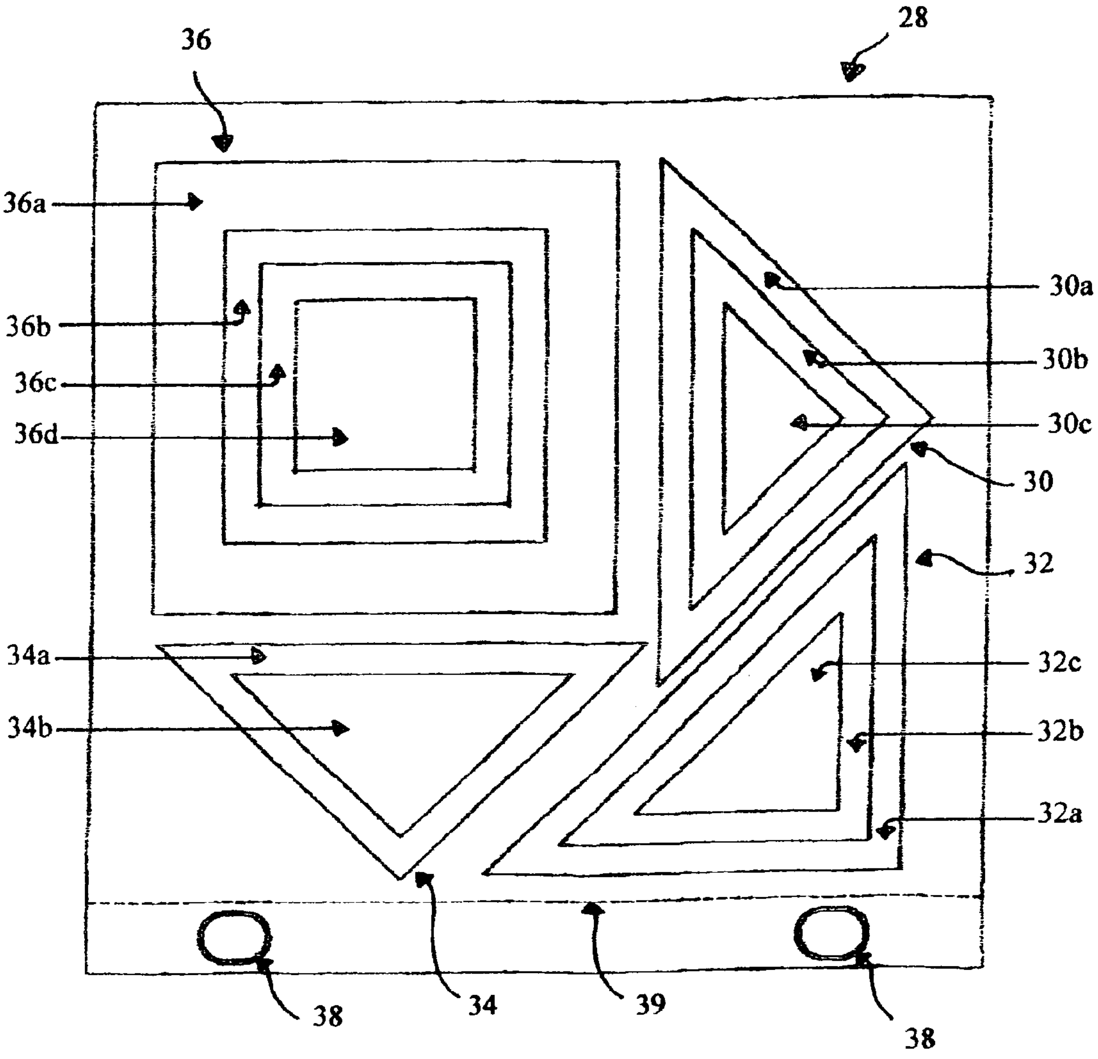
FIG. 1B is a top plan view of the main bottom plate without measurement markings.

FIG. 1B shows a main bottom plate 28, which is the second of three main parts of the preferred embodiment of the present measuring device. The main bottom plate 28 is a transparent, solid, square-shaped planar plate. The main bottom plate 28 and main top plate 10 are equal in peripheral dimensions and depth. This equality of dimensions of the main top plate 10 and main bottom plate 28 is critical for two main purposes: 1) when the main top plate 10 and main bottom plate 28 are connected lengthwise, 76, the cutting and measuring edges of the assembly must be as a single unit, and 2), when the main top plate 10 is placed flat on top of the main bottom plate 28 for portability and storage, the encasing peripheral retainer 41 and 42, discussed below, must fit correctly in order to firmly hold the main top plate 10 and main bottom plate 28 as a unit (FIG. 1D). Measurement markings around the periphery of the main bottom plate 28 may be complimentary to those of the main top plate 10, and, because of nested shapes 30, 32, 34 and 36 discussed below, said measurement markings are omitted in the drawings in order to enhance simplicity and understanding of the main bottom plate 28.

Near one edge of the main bottom plate 28 are male portions 38 of the preferred snap button push-out lengthwise connection system of the main top plate 10 with the main bottom plate 28. The approximated recess depth of male engagement 39 into the top main plate 10 for lengthwise connection of the main top plate 10 with the main bottom plate 28 is illustrated. Further details of the snap button push-out connection system of the main top plate 10 with the main bottom plate 28 are delineated with discussion of FIG. 5 below.

The superior face of the main bottom plate 28 may be partially comprised of a variety of nested triangles 30, 32, and 34, and a variety of nested squares 36. The nested triangles 30, 32, and 34, and the nested squares 36 may be pocketed into the superior face of the main bottom plate 28 such that when all nested shapes are in place, the planar integrity of the surface of the superior face of the main bottom plate 28 is not disturbed. The depth of the nested triangles 30, 32, and 34, and the nested squares 36 may be complimentary to the depth of their respective pockets, which depths may vary with manufacturing, but would generally comprise a depth from ½ to ⅔ the depth of the main bottom plate 28.

The largest of the nested squares 36*a* may be picture frame shaped. The external dimensions of the largest square 36*a* may be exactly complimentary to the peripheral dimensions of its respective pocket. The internal dimensions of the largest square 36*a* may accommodate a second picture frame shaped square 36*b*. The external dimensions of the second square 36*b* may be exactly complimentary to the internal dimensions of the largest square 36*a*. The internal dimensions of the second square 36*b* may accommodate a third picture frame shaped square 36*c*. The external dimensions of the third square 36*c* may be exactly complimentary to the internal dimensions of the second square 36*b*. The internal dimensions of the third square 36*c* may accommodate a fourth square 36*d*. The external dimension of the fourth square 36*d* may be exactly complimentary to the internal dimensions of the third square 36*c*. The fourth square 36*d* may be a solid square.

There may be at least three sets of nested triangles 30, 32 and 34. All nested triangles may have an isosceles shape, and may be a right angle isosceles or simple isosceles shape. The largest triangle 30*a* of the first set 30, the largest triangle 32*a* of the second set 32, and the largest triangle 34*a* of the third set 34, may each be picture frame shaped. Each of the largest triangles 30*a*, 32*a*, and 34*a* may have external dimensions exactly accommodating its respective pocket in the superior face of the main bottom plate 28.

The internal dimensions of the largest triangle 30*a* of the first set 30 may accommodate a second picture frame shape triangle 30*b*. The external dimensions of the second triangle 30*b* of the first set 30 may exactly accommodate the internal dimensions of the first triangle 30*a* of the first set 30. The internal dimensions of the second triangle 30*b* of the first set 30 may accommodate a third triangle 30*c* of the first set 30. The external dimensions of the third triangle 30*c* of the first set 30 may exactly accommodate the internal dimensions of the second triangle 30*b* of the first set 30. The third triangle 30*c* of the first set may be a solid triangle.

The picture frame shaped system of nesting of triangles described for the first set of nested triangles 30 may be applied to the system of nesting triangles for the second set of nested triangles 32. The significant differences between the first set of nested triangles 30 and the second set of nested triangles 32 may be the dimensions of the triangles making up each set of nested triangles 30 and 32. The largest triangle 30*a* of the first set 30 may be approximately one half inch shorter at each external dimension from the largest triangle 32*a* of the second set 32. The second triangle 30*b* of the first set 30 may be approximately one half inch shorter at each external dimension from the second triangle 32*b* of the second set 32. The external dimensions of the solid triangle 30*c* of the first set 30 may be approximately one half inch shorter at each external dimension from the solid triangle 32*c* of the second set 32.

The largest triangle 34*a* of the third set of nested triangles 34 may be pictured framed shaped. The external dimensions of the largest triangle 34*a* of the third set 34 may be slightly shorter than the external dimensions of the largest triangle 30*a* of the first set of nested triangles 30 or the largest triangle 32*a* of the second set of nested triangles 32. The external dimensions of the largest triangle 34*a* of the third set 34 may exactly accommodate the peripheral dimensions of its respective pocket in the superior face of the main bottom plate 28. The internal dimensions of the largest triangle 34*a* of the third set 34 may accommodate a second triangle 34*b*. The second triangle 34*b* of the third set 34 may be a solid triangle.

Figure 2:
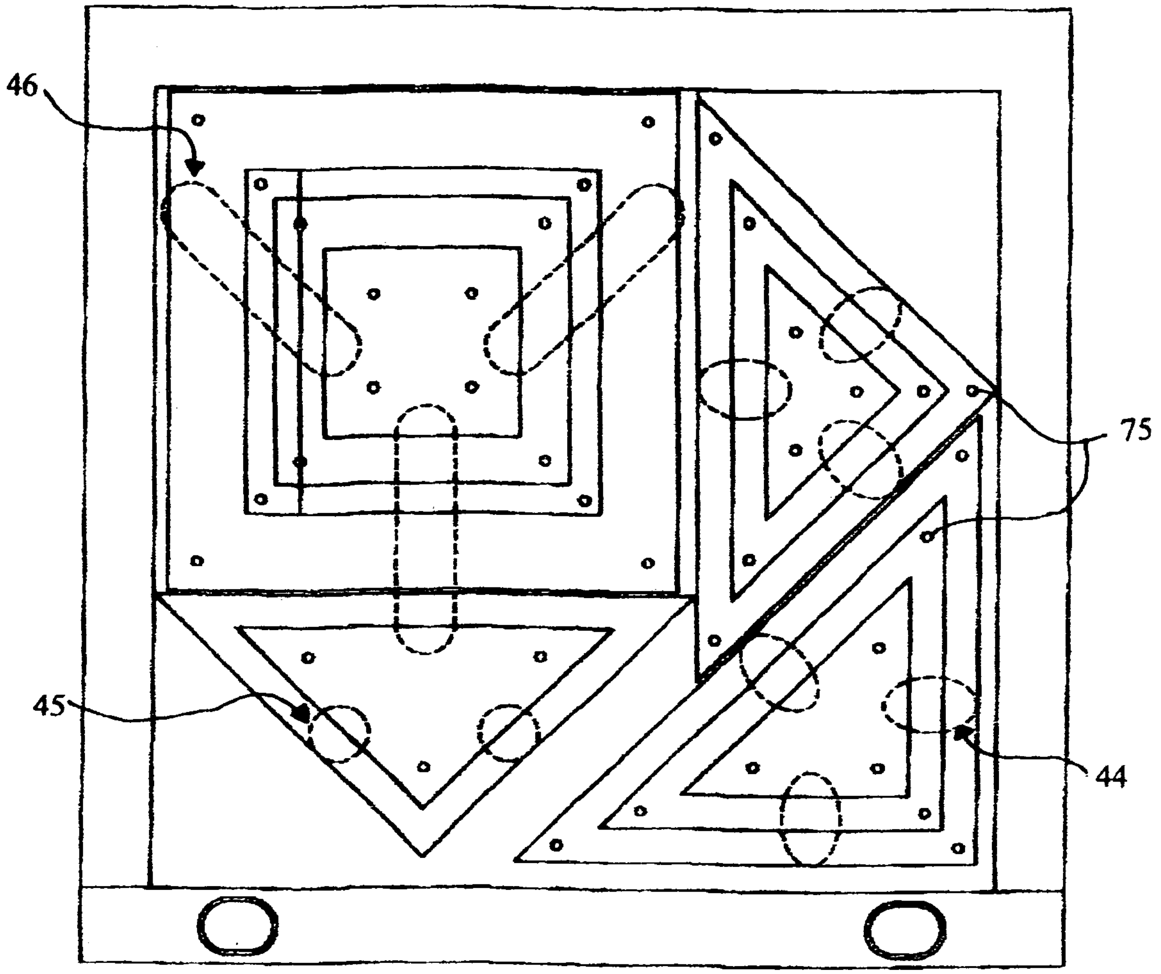
FIG. 2 is a top plan view of the main bottom plate with varied shaped locking systems holding nested triangles and nested squares.

FIG. 2 shows a top plan view of the pocked sets of nested triangles 30, 32, and 34, and the pocketed set of nested squares 36 inside the main bottom plate 28. The nested triangles 30, 32, and 34, and the nested squares 36 may be held in place by a system of varied size oval locking systems 44, varied size round locking systems 45, and varied sized oblong locking systems 46. In the preferred embodiment of said locking systems 44, 45, and 46, a taper lock system 75 on the inferior side of the main bottom plate 28 may also be present if necessary. The triangles of each set of triangles 30, 32, and 34, and the squares of the set of squares 36, may be easily removed for use by pushing upward on the desired locking system 44, 45, and 46, and/or 75 from the inferior side of the main bottom plate 28. The nested triangles of each set 30, 32, and 34, and the nested squares of the set of squares 36, may also be held in place by positioning the inferior surface of the main top plate 10 on top of the superior surface of the main bottom plate 28.

Figure 3:
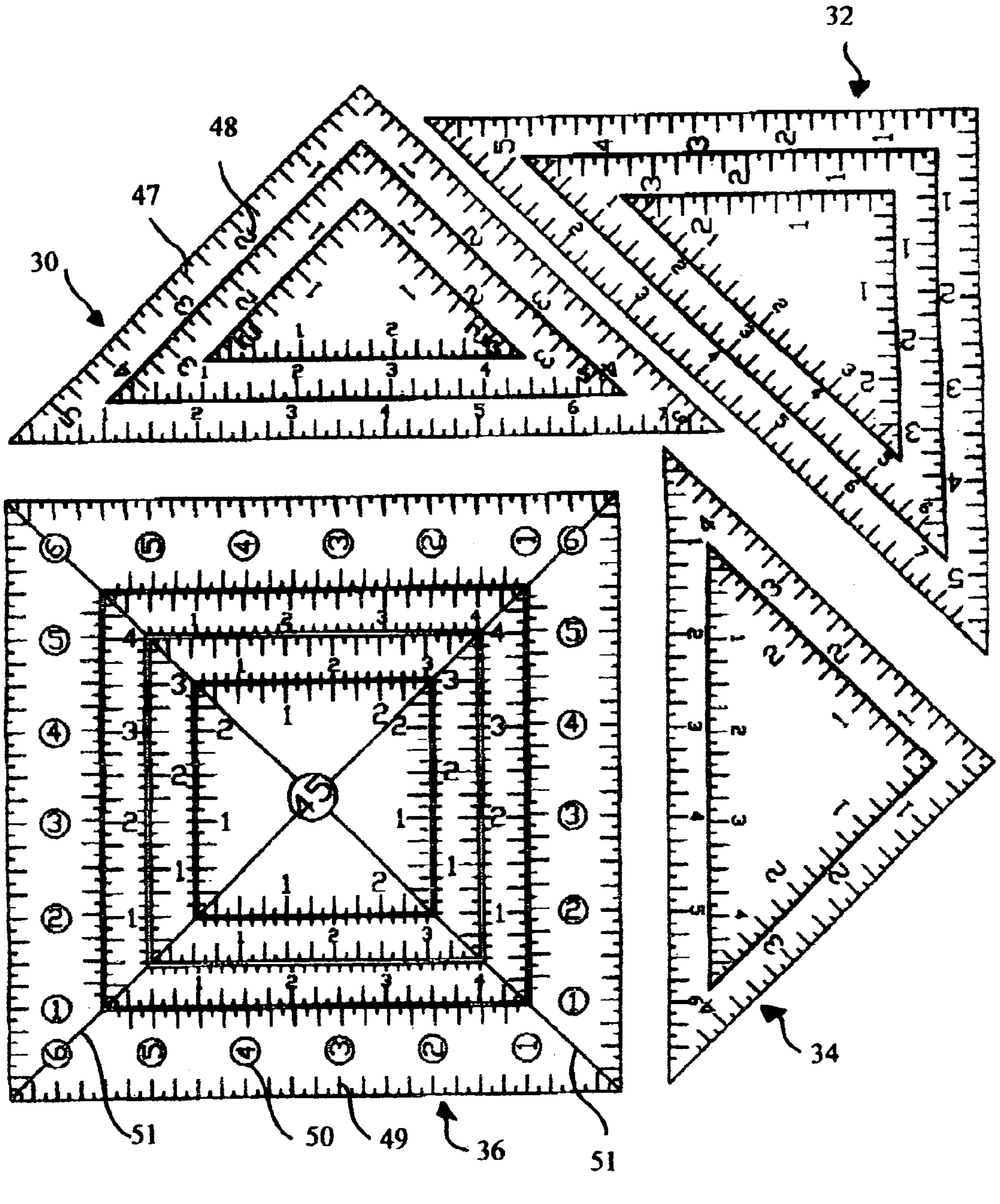
FIG. 3 is a top plan view of various set of nest triangles and nested squares with measurement marking details.
Figure 4A:
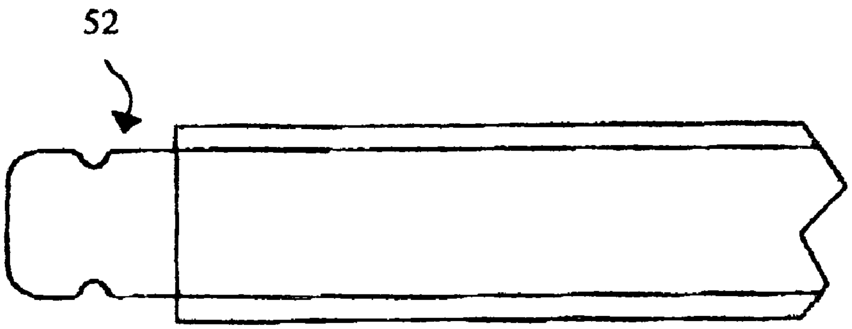
FIGS. 4A to 4D are partial end and top plan views of details of the corner attachment mechanism of the peripheral retainer.
Figure 4B:
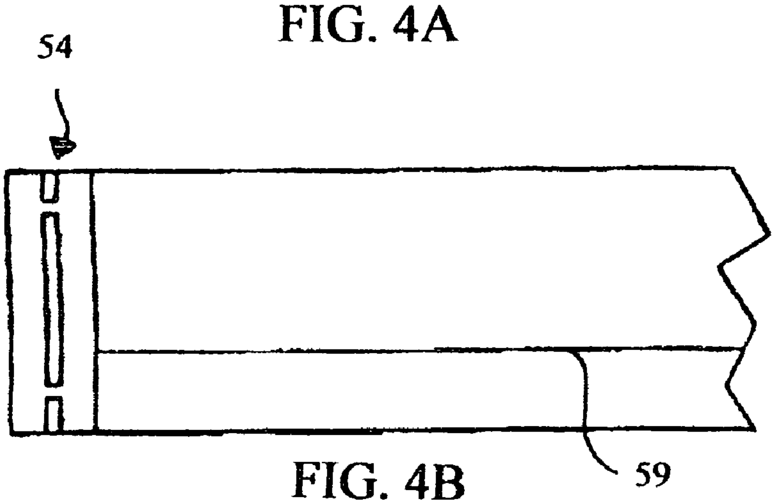
Figure 4C:
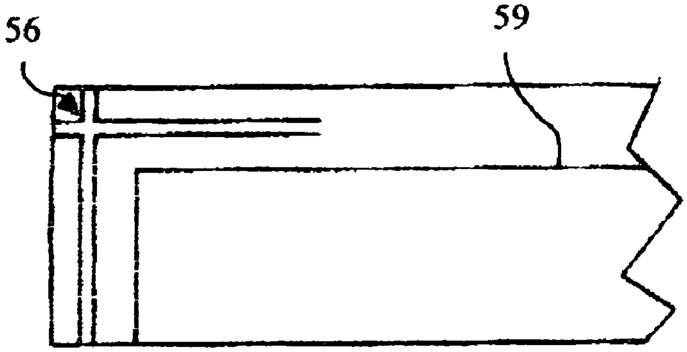
Figure 4D:
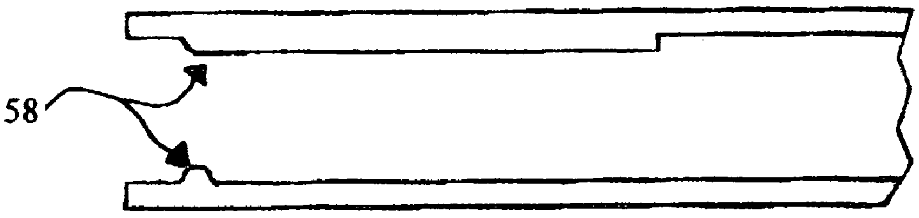

FIG. 3 shows a measurement system of the various triangles in the sets of triangles 30, 32, and 34, and the various squares in the set of squares 36. Each triangle of each set of triangles 30, 32, and 34 may be hatch marked 47 as standard one eighth inch distances around each entire external perimeter. Each triangle of each set of triangles 30, 32, and 34 may also have circled or uncircled distance marker numbers 48 in compliment to perimeter hatch marks 47 of each triangle of each set of triangles 30, 32, and 34. Each of the squares in the set of squares 36 may be hatch marked 49 at standard one eighth inch distances around each entire external perimeter. Each of the squares in the set of squares 36 may also have angle markings 51 at a 45 degree angle from any perimeter edge starting from each corner of each square in the set of squares 36, to facilitate angle cutting and measuring in quilting and craft work.

Figure 1C:
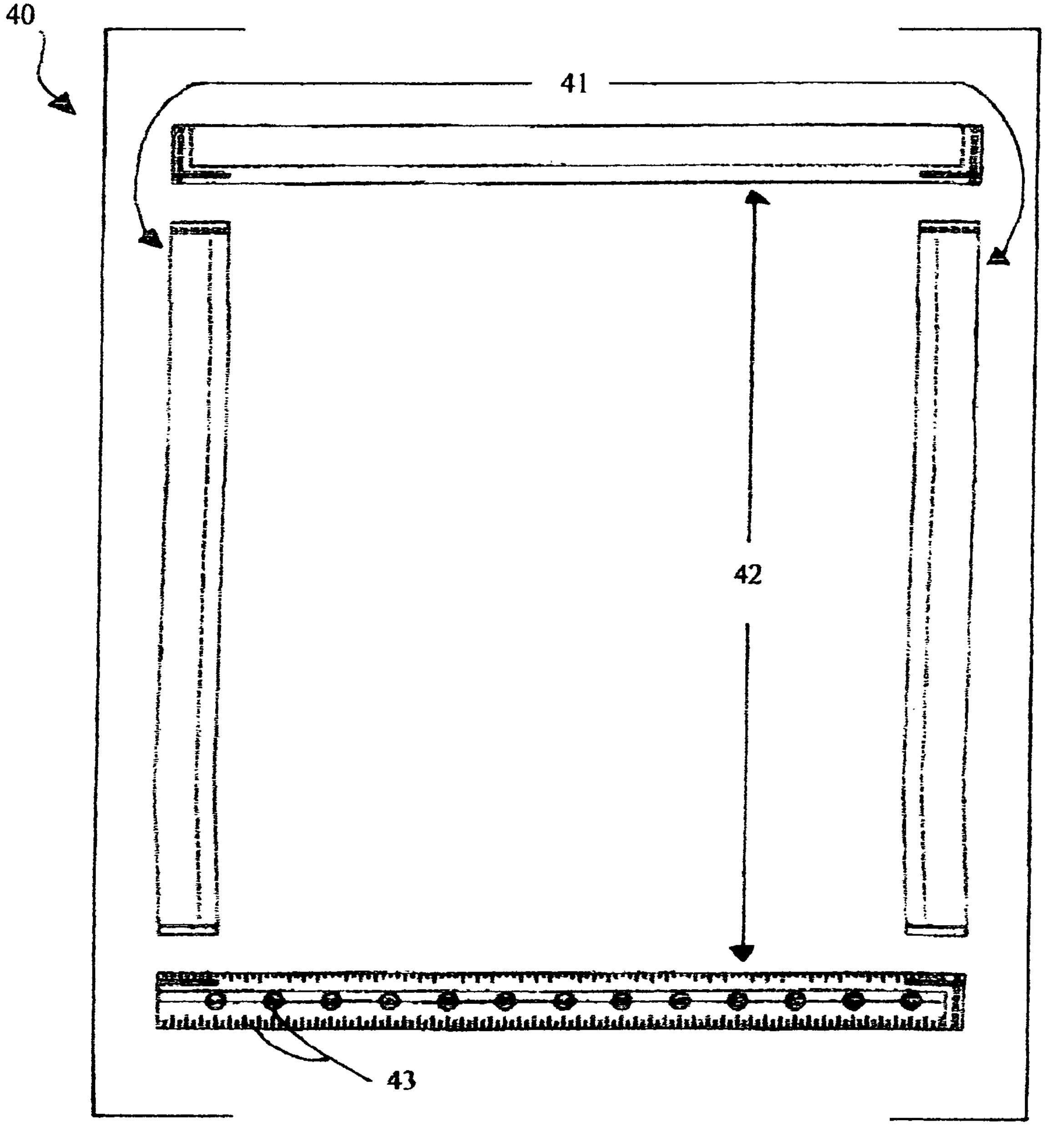
FIG. 1C is a top plan view of the four parts of the peripheral retainer, unattached.
Figure 1D:
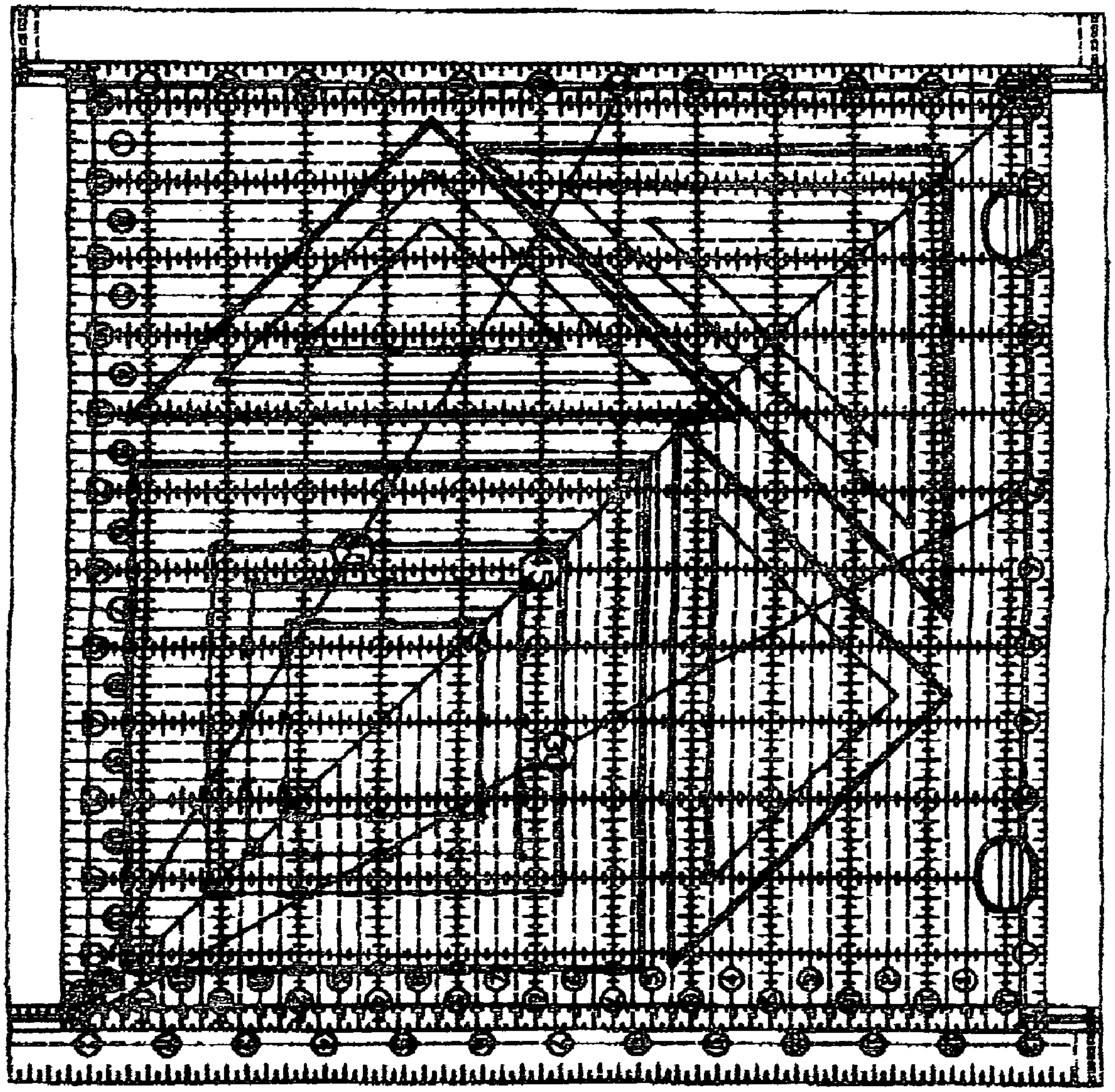
FIG. 1D is a preferred embodiment of all units of FIGS. 1A–C as a single unit assembly.

FIG. 1C shows a peripheral retainer 40, which is the third of three main parts of the preferred embodiment of the present measuring device. Two individual rectangular units with male ends 41 and two individual rectangular units with female ends 42 make up the four basic units of the peripheral retainer 40. The length of each of the two rectangular male ends units 41 and each of the two rectangular female ends units 42 may be equal to the length of any other unit of the four unit peripheral retainer 40. Each of the two rectangular male ends units 41 and each of the two rectangular female ends units 42 may be lengthwise recess-grooved to a partial depth along each respective unit 59. The recess-groove of each male ends units 41 and each female ends unit 42 is for insertion into one side of a two layer flat plate comprised of the main top plate 10 resting on top of the main bottom plate 28, yet the thickness is twice that of either the main top plate 10 or main bottom plate 28. The recess-groove of each male ends retainer unit 41 and each female ends retainer unit 42 may be complimentary to the thickness of the main top plate 10 and main bottom plate 28 two layer unit. The recess-groove portion of the male ends units 41 may be inserted into parallel sides of the two layer main top plate 10 and main bottom plate 28 unit. The recess-groove portion of the female ends units 42 may be inserted into the remaining two parallel sides of the two layer top plate 10 and main bottom plate 28 unit. The ends of the male ends retainer units 41 be complimentary to the ends of the female ends retainer units 42 such that the four basic units of the peripheral retainer 40 may be snap connected at 90 degree angles, forming a picture frame shaped encasement around the main top plate 10 and main bottom plate 28 two layer unit. When the four basic units of the peripheral retainer 40 are snap connected as an encasement of the two layer main top plate 10 and main bottom plate 28 unit, the three main parts of the preferred embodiment of the present measuring device may be transported or stored as a single unit (FIG. 1*d*). The sets of nested triangles 30, 32, and 34, and the set of nested squares 36 which are pocketed into the main bottom plate 28 may be protected by the encased main top plate 10.

The four basic units of the peripheral retainer 40 may be snap connected to create a picture frame shaped encasement as described. The four basic units of the peripheral retainer 40 may also be snap connected lengthwise one to another, creating a measuring device approximately four times longer than the length of any individual retainer unit. This very long measuring device is often useful in quilting and craftwork, such as when measuring bolts of fabric materials.

Each of the two male ends retainer units 41 and each of the two female ends retainer units 42 may have standard measurement markings along its respective length as shown by example 43, which may be hatch markings at one eighth inch intervals, and may be circled or uncircled number at one inch intervals. The circled or uncircled numbers 43 may be incremental around the entire perimeter of the picture framed shaped retainer 40, such that when the four basic units are snap connected lengthwise, the circled or uncircled numbers may be incrementally employed along the entire measuring length.

FIG. 1D is a top plan view of a preferred embodiment of the multiple unit transparent measuring device, wherein comprising all units of FIGS. 1A, 1B, and 1C, with all units assembled as a single unit. Since the main bottom plate is essentially hidden with the assembled unit, the main bottom plate 28 when mentioned in FIG. 1D may be better viewed in FIG. 1B. To create the single unit assembly, the main bottom plate 28 may be first placed on a flat surface. The main bottom plate 28 may be partially comprised of the sets of nested triangles 30, 32, and 34, and the set of nested squares 36 pocketed within the main bottom plate 28. The inferior planar surface of the main top plate 10 may then be rested upon the superior planar surface of the main bottom plate 28. With the placement of the main top plate 10 flat on top of the main bottom plate 28, the sets of nested triangles 30, 32, and 34, and the set of nested squares 36, may be protected from removal upon transport or storage of the assembled unit. The two layer plate comprised of the main top plate 10 and the main bottom plate 28 may now be with peripheral dimensions the same as those of either the main top plate 10 or the main bottom plate 28. The thickness of the two-layered plate may be, however, twice that of either the main top plate 10 or the main bottom plate 28. In order to maintain the placement of the main top plate 10 and main bottom plate 28 as a two layer plate, a four part peripheral retainer 40 may be connected as a picture frame shaped encasement around the two layer plate. Each of the four parts 41 and 42 of the peripheral retainer 40 may be recess-grooved to accommodate the thickness of the two-layer main top plate 10 and main bottom plate 28.

FIGS. 4A to 4D show the preferred snap connection system of the two male ends retainer units 41 with the two female ends retainer units 42 in detail. A partial side view of one of the two male ends retainer units 52 (FIG. 4A) and a partial top view of one of the two male ends retainer units 54 (FIG. 4B) is illustrated. A partial top view of one of the two female ends retainer units 56 (FIG. 4C) and a partial side view of one of the two female ends retainer units 58 (FIG. 4D) is also illustrated. The mechanism for the choice of utilizing the system of 90 degree angle connection, or the system of lengthwise connection, of each end of any male ends retainer unit 41 with each end of any female ends retainer unit 42, may be further appreciated by these details 52–58. The depth of the lengthwise recess-groove 59 of each male ends retainer unit 41 and each female ends retainer unit 42 is also illustrated in more detail.

Figure 5:
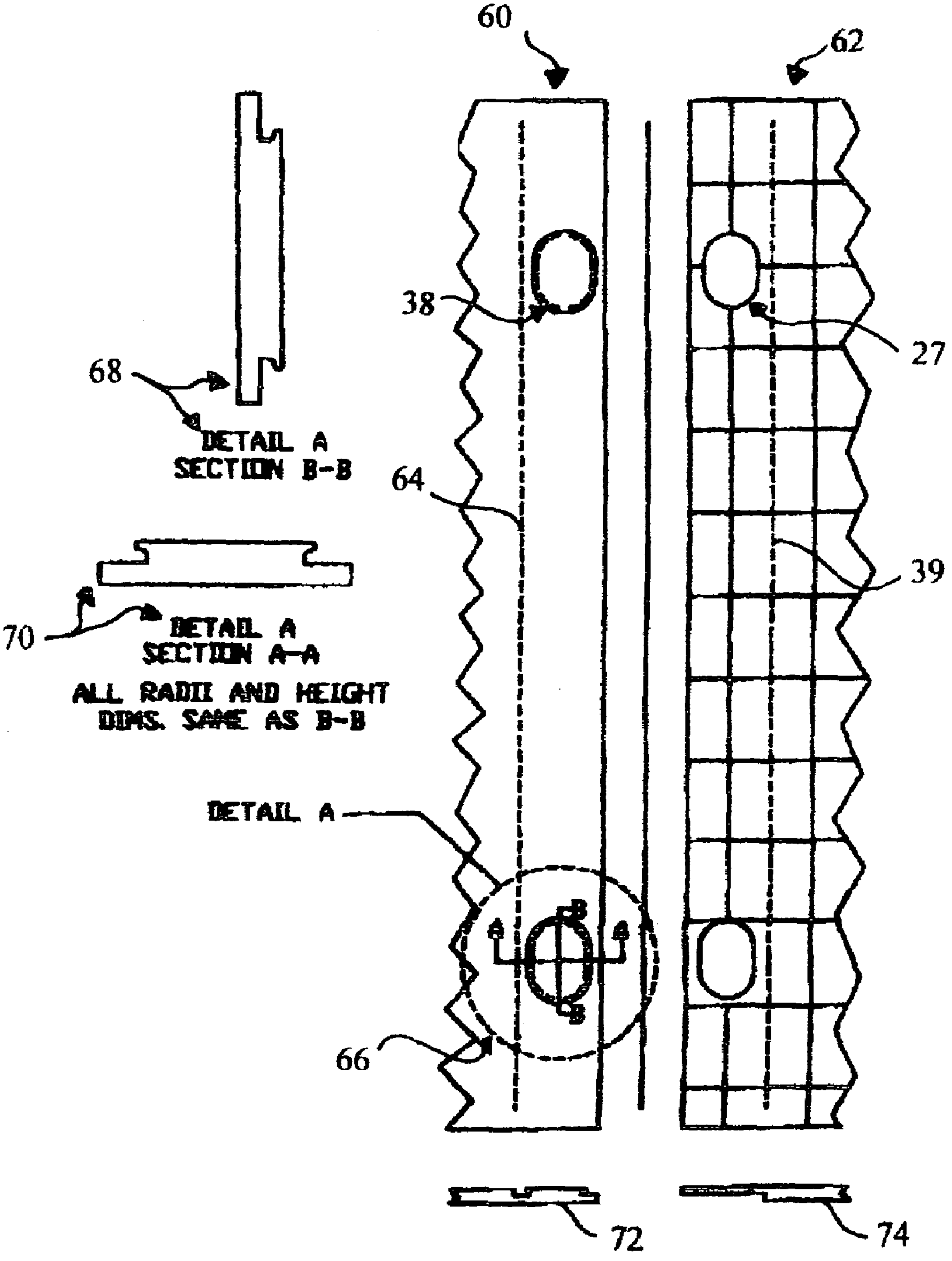
FIG. 5 is a partial view, with details, of the preferred snap button push-out lengthwise connection system of the main top and main bottom plate.
Figure 6:
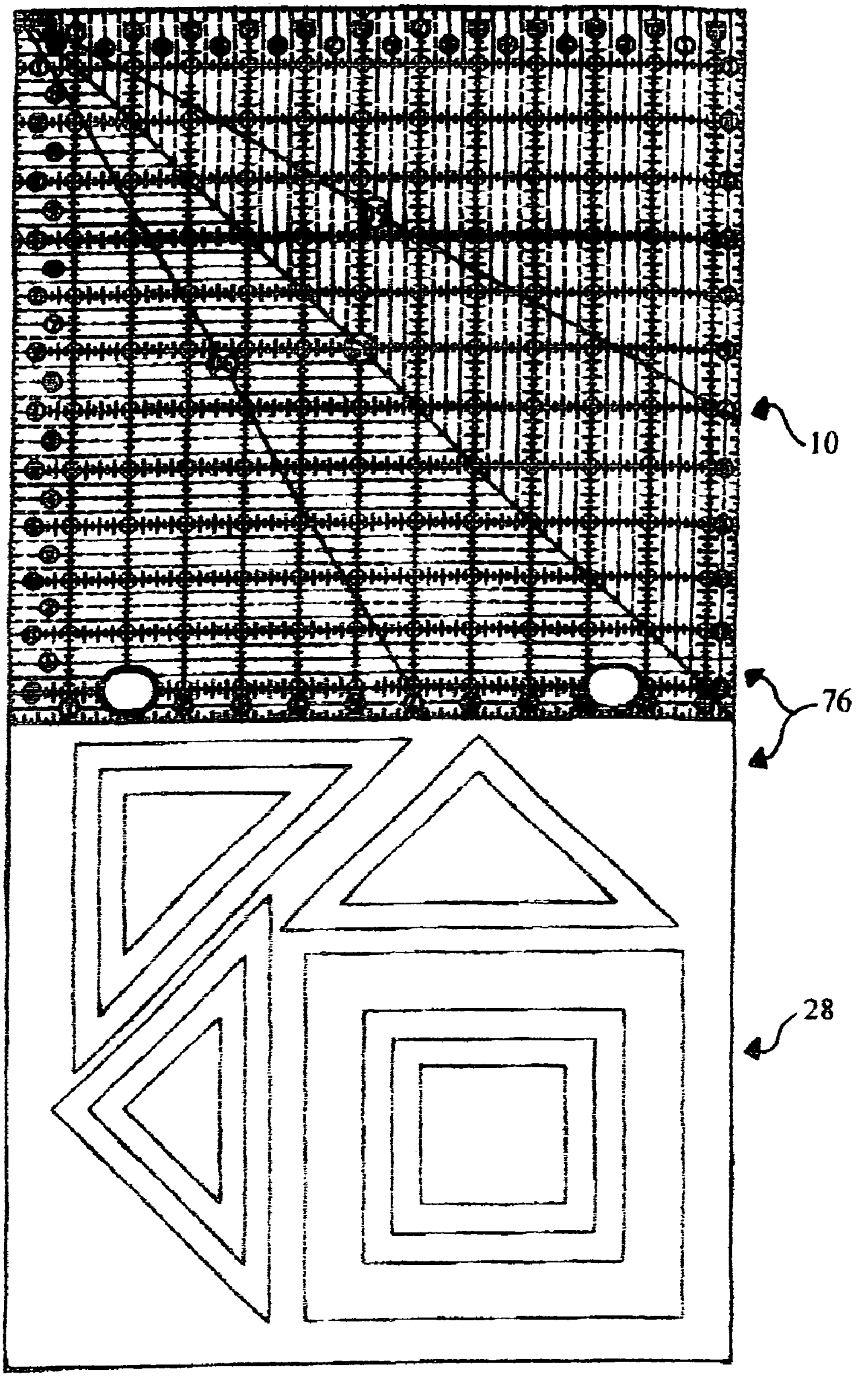
FIG. 6 is a top plan view of the main top plate ad main bottom plate connected lengthwise with the preferred snap button push-out system.

FIG. 5 shows a partial from view of the preferred snap button push-out lengthwise connection system of the main top plate 10 and main bottom plate 28, with details. The male portions of the lengthwise connection system 38 may be located near the periphery of one side 60 of the main bottom plate 28. The female portions of the lengthwise connection system 27 may be located near the periphery of one side 62 of the main top plate 10. The male portions of the lengthwise connection system 38 may be recess-grooved 64 to be complimentary to the recess-grooved 39 female portions of the lengthwise connection system 27. With this system, the male portions of the lengthwise connection system 38 and the female portions of the lengthwise connection system 27 may be approximated and snapped together, therein joining the main top plate 10 and main bottom plate 28. The lengthwise connection of the main top plate 10 and main bottom plate 28 creates a measuring device with approximately twice the length of any individual side of the main top plate 10 or main bottom plate 28. The number of said snap button push-outs on each said main plate 10 and 28 may vary, such as to allow alternative lengthwise connection systems if said main plates 10 and 28 are reduced or increased in size.

Further details of one male portion 38 of the snap button push-out lengthwise connection system are seen with two cross-sectional views of Detail A 66. One cross-sectional view of Detail A 66 comprises Section B—B (the long diameter) 68 of the oval male portion 38 of the snap button push-out lengthwise connection system. The second cross-sectioned view of Detail A 66 comprises Section A—A (the short diameter) 70 of the oval male portion 38 of the snap button push-out lengthwise connection system. A partial end view of the male portions 38 of the snap button push-out lengthwise connection system 72, and a partial end view of the female portions 27 of the snap button push-out lengthwise connection system 74, are also depicted for further detail of the connection system.

FIG. 6 shows a top plan view of the main top plate 10 and the main bottom plate 28 connected lengthwise 76. The main top plate 10 and main bottom plate 28 are connected lengthwise 76 employing the preferred snap button push-out lengthwise connection system comprising engagement of two male snap button portions 38 and two female snap button portions 27. This lengthwise connection 76 creates a cutting and measuring device with a length approximately twice that of either the main top plate 10 or the main bottom plate 28. The advantages of this lengthwise connection 76 are discussed in above sections.

Figure 7:
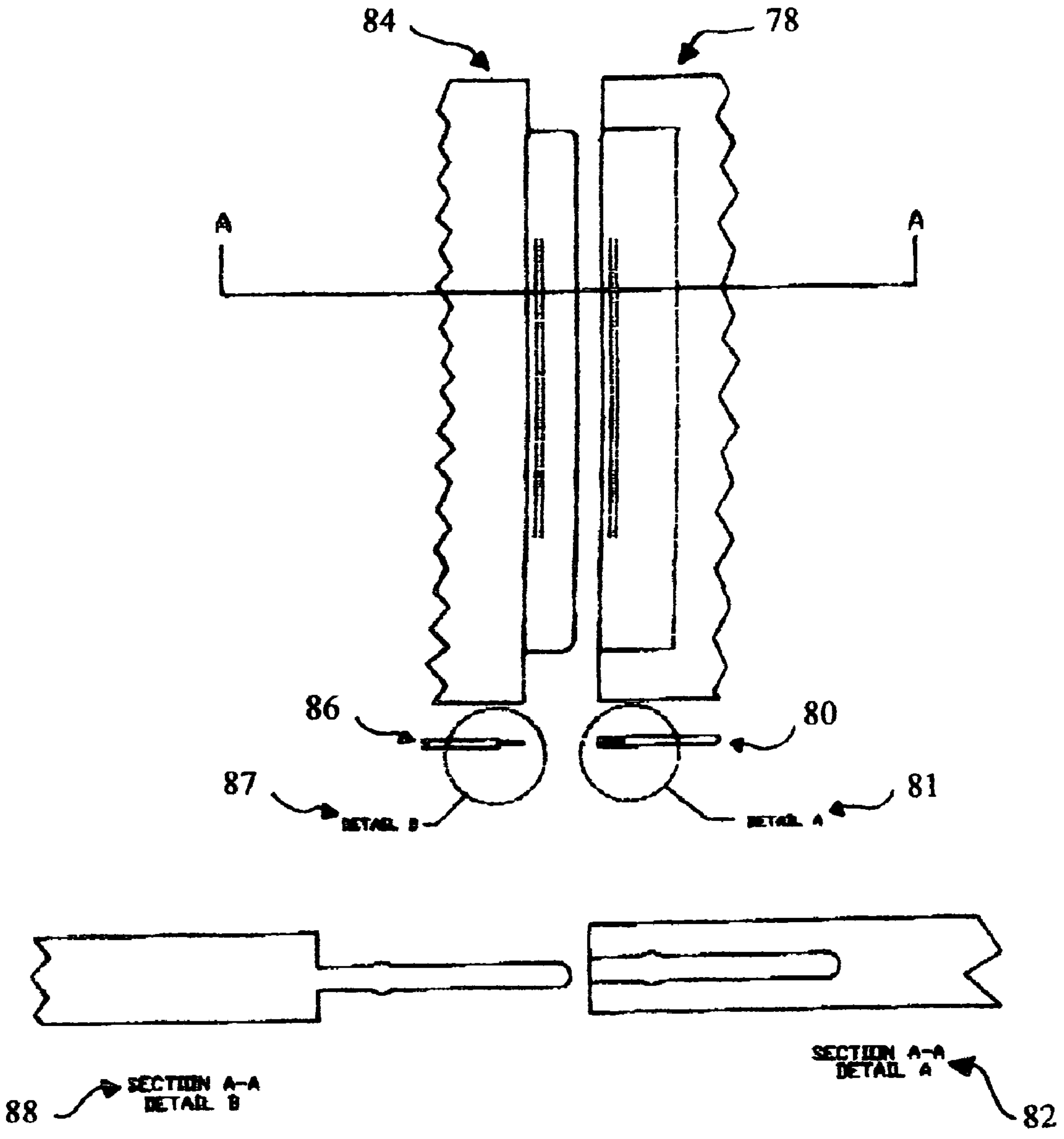
FIG. 7 is a partial front and side view, with details, of an alternative lengthwise connection of the main top plate and main bottom plate, which is a mortise and tenon system.

FIG. 7 shows a partial view of an alternative lengthwise connection system of the main top plate 10 and the main bottom plate 28, with details. This alternative connection system may be a mortise and tenon attachment system, wherein the mortise portion 78 comprises part of one side of the main bottom plate 28 and the tenon portion 84 comprises part of one side of the main top plate 10. The mortise portion 78 and the tenon portion 84 may be recess-grooved such that when the mortise portion 78 and the tenon portion 84 are engaged, the side of the main top plate 10 and the side of the main bottom plate 28 may be joined as a single unit. Further detail of the mortise portion 78 of the alternative lengthwise connection system is illustrated in a partial side view of the mortise portion 80. A portion of the partial side view of the mortise portion 80 is further detailed by Detail A 81, wherein Detail A 81 is shown in cross-section as Section A—A of Detail A 82. Further detail of the tenon portion 84 of the alternative lengthwise connection system is illustrated in a partial side view of the tenon portion 86. A portion of the partial side view of the tenon portion 86 is further detailed by Detail B 87, wherein Detail B 87 is shown in cross-section as Section A—A of Detail B 88.

All units of the multiple unit transparent measuring device may be comprised of a transparent plastic material. The transparent plastic material comprising the multiple units may be of a less breakable nature than the generally used acrylic plastic comprising individual units of presently available transparent devices. The transparent plastic material used for the units of the preferred embodiment of the multiple unit transparent measuring device may be of a polycarbonate or other transparent polymer plastic resin. The generally employed acrylic plastic is more easily chipped or broken, and is less flexible, than polycarbonate or several other transparent polymer resins.

Even though the descriptions of the preferred and alternative embodiments of the multiple unit transparent measuring device given above are as clear as possible, it is understood that minor changes may be made therein without wandering from the express spirit and scope of the invention of the device. The scope of the invention may be determined by the following discussion of the claims.

What is claimed is:

1. A measuring device for flexible material, comprising:

a first member being planar, having at least one right angle and a geometric shape, and further having a first surface with a plurality of measurement markings; and, a second member being planar, having at least one right angle and of equal size and shape as of the first member, and having a first surface with a plurality of measurement markings and a plurality of geometrically shaped cavities, wherein when in use, the second member is removably connectable to the first member such that the right angle of the first member and the right angle of the second member are adjoined along a planar edge of each member and the measurement markings are aligned increasing the length along which a measurement can be made.

2. The material measuring device, as recited in claim 1, further comprising a third member having two portions with male connector ends and two portions with female connector ends, each portion having a length and a plurality of measurement markings, further the four portions each have a channel along the length and the portions are removably connectable in at least one of a first and a second position, wherein when in the first position the portions are removably connected at right angles to each other and are operably configured to receive both the first and second member within the channel such that the first and second member are stacked, and in the second position the portions are removably connected along the length male end to female end, aligning the measurement markings.

3. The measuring device, as recited in claim 1, wherein the first and second members are square.

4. The measuring device, as recited in claim 1, wherein the first and second member are transparent.

5. The measuring device, as recited in claim 1, further comprising a plurality of removable geometrically shaped nested guides operably configured to engage the plurality of geometrically shaped cavities and the geometrically shaped nested guides include a plurality of measurement markings.

6. The measuring device, as recited in claim 1, wherein the measurement markings of the first and second members include delineated measurements in both incremented units and decremented units.

7. The measuring device, as recited in claim 1, wherein the cavities of the second member extend through the entirety of the second member.

8. A measuring device, for flat and flexible sheet material, comprising:

a first member being planar, having at least one right angle and a geometric shape, and further having a first surface with a plurality of grid markings;

a second member being planar, having at least one right angle and of equal size and shape as of the first member, and having a plurality of grid markings, wherein the second member is removably connectable to the first member along a planar edge of each member when in use; and, an assembly having a plurality of frame portions and at least two assembled postions, wherein the frame portions each have a length and a plurality of grid markings, further wherein the frame portions each have a channel along the length and the frame portions are removably connectable in at least one of a first and a second position, wherein when in the first position the portions are removably connected at right angles to each other and are operably configured to receive both the first and second member within the channel such that the first and second member are stacked and framed by the assembly; and in the second position the portions are removably connected along the length.

9. The measuring device, as recited in claim 8, wherein the first and second and members are square.

10. The measuring device, as recited in claim 8, wherein the first, second and third members are transparent.

11. The measuring device, as recited in claim 8, wherein the second member further includes a plurality of geometrically shaped cavities and a plurality of removable geometrically shaped guides, wherein the removable geometrically shaped guides are operably configured to engage the plurality of geometrically shaped cavities and the geometrically shaped guides includes a plurality of grid markings.

12. The measuring device, as recited in claim 8, wherein the grid markings on the first member comprise a set of parallel linear marking at a 90 degree angle from a second set of parallel linear markings, wherein both sets of parallel markings are delineated English units of measurement.

13. The measuring device, as recited in claim 8, wherein the first member further includes a first and second portion, wherein the first and second portions are generally rectangular and are removably connected to form the first member.

14. The measuring device, as recited in claim 8, wherein the first, second and third member are polycarbonate plastic.

15. The measuring device, as recited in claim 8, wherein the grid markings of the first and second members include delineated measurements in both incremented units and decremental units.

16. A multiple unit measuring device, for flat, flexible sheet material, comprising:

a main top plate being square having a inferior surface and a superior surface, and having a plurality of grid markings;

a main bottom plate being square having a inferior surface and a superior surface and of equal size as of the first member, and having a plurality of grid markings and a plurality of geometrically shaped cavities, wherein when in use, the main bottom plate is removably connectable to the main top plate along a planar edge of each plate and the grid markings are aligned increasing the length along which a measurement can be made;

two first portions each having male connectors, an equal length, and a plurality of grid markings;

two second portions each having female connectors, an equal length to the two first portions and a plurality of grid markings, wherein the two first and two second portions each have a channel along their length and the portions are removably connectable male end to female end in at least one of a first and a second position, wherein when in the first position the portions are removably connected at night angles to each other and are operably configured to receive both the maim top and main bottom plates within the channel such that the maim top and main bottom plates are stacked with the inferior surface of the main top plate against the superior surface of the main bottom plate, and in the second position the portions are removably connected along the length; and, a plurality of nested geometric shapes having a plurality of grid marking that correspond to the plurality of geometric cavities in the second member, such that the cavities prevent the shapes from moving.

17. The multiple unit measuring device, as recited in claim 16, wherein the main top plate further includes a first and second portion, wherein the first and second portions are generally rectangular and are removably connected to form the main top plate.

18. The multiple unit measuring device, as recited in claim 16, wherein the grid markings on the main top plate and the main bottom plate comprise a set of parallel linear marking at a 90 degree angle from a second set of parallel linear markings, wherein both sets of parallel markings are delineated English units of measurement.

19. The multiple unit measuring device, as recited in claim 16, wherein the main top plate has a plurality of female connector portions and the main bottom plate has a plurality of mail connector portions in equal number to the female connector portions and the male connector portions are operably configured to engage the female connector portions.

20. The multiple unit measuring device, as recited in claim 16, wherein the grid markings of the main top plate and main bottom plate include delineated measurements in both incremental units and decremental units.

* * * * *